Dec. 10, 1946.  G. A. MORTON  2,412,467

ELECTRONIC COMPUTER

Filed April 28, 1945

INVENTOR.
George A. Morton
BY
ATTORNEY.

Patented Dec. 10, 1946

2,412,467

UNITED STATES PATENT OFFICE 2,412,467

ELECTRONIC COMPUTER

George A. Morton, Princeton, N. J., assignor to Radio Corporation of America, a corporation of Delaware Application April 28, 1945, Serial No. 590,849

5 Claims. (Cl. 235—61)

This invention relates to electronic computers such as are utilized to derive a function of a plurality of variables, and has for its principal object the provision of an improved apparatus and method of operation whereby there is established a representation or indication of the value of a function predetermined by a set of applied potentials each of an amplitude proportional to the value of a different variable.

The present application is a continuation-in-part of an application Serial No. 481,051, filed March 29, 1943.

In the accomplishment of this object, use is made of a cathode ray tube wherein the cathode ray is normally deflected to a reference point near one corner of a target provided with secondary electron emissive marks arranged in accordance with the particular function to be derived. The ray is deflected from this reference point along one rectangular coordinate in response to a voltage of an amplitude proportional to a selected value of one of the variables. When the deflection of the ray along this coordinate is completed, the ray is deflected along the other rectangular coordinate and across the secondary electron emissive lines of the target in response to a voltage of an amplitude proportional to a value of another of the variables. As the cathode ray crosses each secondary electron emissive mark, there is delivered from the target to a counter a series of positive pulses whereby a representation of the value of the function is established in the counter. The secondary electrons emitted from the target are collected by a cylindrical collector and returned to the cathode of the tube through a voltage dividing resistor from which certain other operating potentials of the tube are derived.

The ray deflecting voltages proportional in amplitude to the selected values of the variables may be applied separately or simultaneously. If applied separately, they may be applied directly to the deflectors of the tube. If they are applied simultaneously, means including a trigger circuit of the slide-back type are provided for delaying the application of one of the voltages to the deflectors of the tube until the deflection produced by the other of the voltages has been completed.

After the application to the deflectors of each set of voltages proportional in amplitude to selected values of the variables, the ray returns to its normal position at the reference point near one corner of the target. During its return travel, it is blanked out. It is eventually re-established at a secondary electron emissive auxiliary target from which a positive pulse is provided for resetting the counter in a manner well known in the art. Representations of other values of the function are similarly established by the application of other deflecting voltages proportional in amplitude to other values of the variables and are similarly erased if the auxiliary target previously mentioned is connected to the counter.

Important objects of the invention are the provision of an improved computer for deriving a predetermined function of two variables which are available in the form of voltages having amplitudes proportional to the selected values of the variables; the provision of means for causing two simultaneous applied deflecting voltages to be utilized successively; and the provision of means for resetting a counter in response to the completion of the scanning of the target of a cathode ray tube.

The invention will be better understood from the following description considered in connection with the accompanying drawing and its scope is indicated by the appended claims.

Referring to the drawing.

Figure 1:
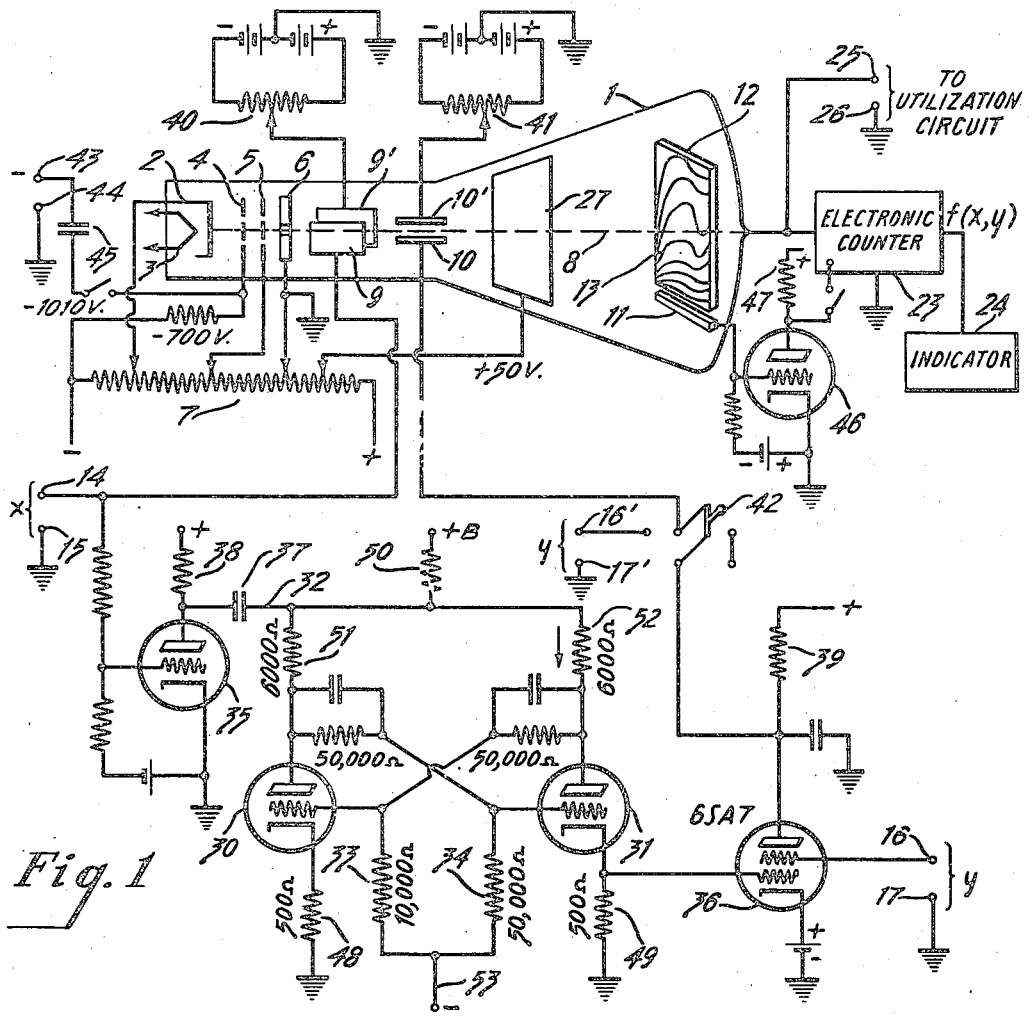
Figure 1 is a wiring diagram of the improved computer.

The computer illustrated by Fig. 1 includes a cathode ray tube 1 which has a cathode 2 heated by a heater 3, a control grid 4, a screen grid 5, an anode 6, a pair of horizontal deflectors 9—9', a pair of vertical deflectors 10—10', a cylindrical secondary electron collector 27, a target 12 provided with secondary electron emissive marks 13, and an auxiliary target 11 having a secondary electron emissive surface.

The various potentials required for operation of the tube 1 are derived from a voltage divider resistor 7 connected to a source of voltage (not shown). Suitable operating voltages for the various electrodes of the tube 1 are indicated by legends near their various leads. It should be understood, however, that these indicated voltages are merely exemplary and are not to be regarded as critical for the reason that they may be varied over a considerable range without impairing the operation of the tube.

Figure 2:
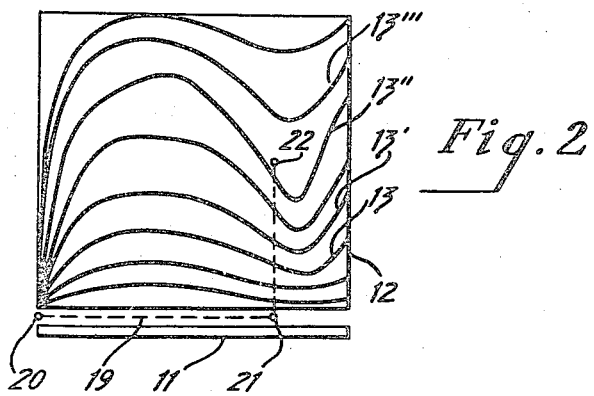
Figure 2 is a front elevation view of the target bearing the secondary electron emissive lines representative of the function to be derived.

The cathode ray of the tube 1 may be biased to the reference point 20 (Fig. 2) in different ways. Thus the various electrodes of the tube may be so alined as to cause the ray to be at the point 20 when no voltage is applied to the deflectors 9—9' and 10—10'. Another way of accomplishing the same result is to aline the electrodes so that the ray tends to follow the path indicated by the broken line 8 and to apply to the deflectors such biasing voltages as are required to cause the ray to be at the point 20 when no signal voltage is applied to the terminals 14—15 and 16—17. Thus assuming the biasing resistors 40 and 41 to have been so adjusted that the beam is at the reference point 20 and no signal voltage is to be applied to the terminals 14—15 and 16—17, the tube 36 is cut off, the voltage drop of the resistor 39 is reduced to a minimum, and a more positive voltage is applied to the electrode 10.

Voltage pulses proportional in amplitude to the selected values of the variable $x$ are applied to the terminals 14—15 and thence directly to the deflector 9. As is well understood, the application of a voltage pulse of positive polarity to the deflector 9 causes the cathode ray to move from the reference point 20 along the path 19 (Fig. 2) toward a point 21 determined by the amplitude of the voltage pulse.

Voltage pulses proportional in amplitude to the selected values of the variable $y$ are applied either directly to the deflector 10 through the terminals 16'—17' and a switch 42, or through terminals 16—17, the switch 42, and a pulse delay circuit, depending on whether a given set of $x$-representative and $y$-representative pulses are applied successively or simultaneously. As is well understood, the application of a voltage pulse of negative polarity to the deflector 10 causes the cathode ray to move from the point 21 to a point 22 depending on the amplitude of the pulse. The same result is produced of course if the resistor 41 be connected to the deflector 10 and a voltage pulse of positive polarity be applied to the deflector 10' through the terminals 16'—17' or otherwise.

The voltage pulses applied to the deflectors 9 and 10 are of sufficient duration to ensure that the cathode ray moves from the point 20 to the point 21 and thence to the point 22, the distance between the points 20 and 21 being determined by the amplitude of the $x$ representative pulse and that between the points 21 and 22 being determined by the amplitude of the $y$ representative pulse. After the cathode ray has completed its travel it returns to the reference point 20. During its return, it is blanked out by a negative pulse applied before the end of the $x$ and $y$ representative pulses from any suitable source to the control grid 4 through terminals 43—44 and a coupling capacitor 45. Continuous operation of the computer is thus responsive to an $x$-representative pulse applied to the terminals 14—15, a $y$-representative pulse applied to the terminals 16'—17'' or 16—17, and a negative pulse applied to the terminals 43—44 for blanking the cathode ray during its return travel so that output pulses are delivered by the cathode ray tube 1 only during the travel of the ray from the path 19 to the proper point on the target.

As the beam travels upwardly from the path 19, there is applied to the terminals 25—26 and to a counter 23 a positive pulse each time the ray crosses one of the secondary electron emissive marks 13. An indication of the number of these positive pulses is shown by the indicator 24 or by any other suitable indicating means. These pulses may also be applied on utilization circuits or the like. During its return travel, the cathode ray is blanked out until it reaches the reference point 20 where its blanking voltage is removed and it is permitted to strike the auxiliary target 11. When the ray strikes the secondary electron emissive area of the auxiliary target 11, a positive pulse is applied to the grid of a normally biased off triode 46, and this triode draws current through an anode resistor 47, thereby applying a negative pulse to the counter 23 for resetting this counter to a standby condition. In cases where it is not desirable to clear the counter 23 immediately after return of the beam to the reference point 20, the pulse applied to the terminals 43 and 44 may be of such duration as is required to cut off the beam for the required period or the beam may be returned to a position where it does not strike the target 11 until it starts its travel along the path 19.

The counter 23 may be of any suitable form, many of which are well known in the art. For example, it may include a plurality of trigger circuit units connected in cascade and each operable to two stable operating conditions in response (1) to a negative pulse applied to the common terminal of the anode resistors of the unit, (2) to a negative pulse applied to the control grid of a conducting tube of the unit, or (3) to a positive pulse applied to the control grid of a nonconducting tube of the unit. Means for resetting counters of this type in response to the application of a negative pulse form no part of the present invention and are too well known to require detailed description (see U. S. Patent 2,272,070).

The means for delaying the $y$-representative voltage pulse includes a trigger circuit unit 30—31—33—34 which differs from those of the counter 23 in that it has only one stable operating condition. Such a unit is commonly known as a slideback trigger circuit unit. It includes a pair of triodes 30 and 31 which (1) have their grids and anodes cross connected in a well known manner, (2) have their cathodes connected to ground through resistors 48 and 49, (3) have their anodes connected to a source of +B voltage through a common resistor 50 and through individual resistors 51 and 52, and (4) have their grids connected to a source of negative bias potential through a common lead 53 and individual resistors 33 and 34. Suitable values for the various parts of the unit are indicated by legends placed adjacent the respective parts.

Due to the fact that the resistance of the grid resistor 34 is much higher than that of the grid resistor 33, current normally flows through the triode 31 as indicated by the arrow. When a negative pulse is applied to the common anode terminal 32, however, current is temporarily interrupted at the triode 31 and is taken by the triode 30. After a time interval of a length determined by the difference between the values of the resistors 33 and 34, current automatically returns to the triode 31 and is interrupted at the triode 30.

Thus when a positive pulse is applied to the terminals 14—15, a tube 35 becomes conductive; a negative pulse, due to the potential drop of a resistor 38, is applied through a coupling capacitor 37 to the lead 32, and current is temporarily taken by the triode 30 and interrupted at the triode 31. While the triode 31 is not conducting current, its cathode is at more negative potential and no current is conducted by a tube 36 which has its first control grids connected to this cathode. After a predetermined time delay, (1) current is taken by the triode 31 and interrupted at the triode 30, (2) the first control grid of the tube 36 becomes more positive, (3) the tube 36 takes current if a positive potential is applied to its second control grid through the terminals 16—17, (4) a more negative potential is applied to the deflector 10 due to the potential drop of a resistor 39, and (5) the cathode ray is deflected upwardly from the auxiliary target 11 across the secondary electron emissive marks of the target 12. The time delay circuit thus functions to delay application of the y-representative pulse to the deflector 10 until the cathode ray has completed its travel along the path 19 in response to the x-representative impulse. As previously indicated, this time delay circuit may be omitted and the y-representative pulses applied directly to the deflector 10 if the x-representative and y-representative pulses are applied successively instead of simultaneously. It is of course apparent that the cathode ray is deflected upwardly across the target 12 either in response to the application of a positive pulse to the terminals 16—17 or to the application of a negative pulse to the terminals 16'—17'.

The principal features of the invention were disclosed in my copending application Serial No. 481,051, filed March 29, 1943, of which the present application is a continuation in part.

I claim as my invention:

1. The combination of a target having secondary electron emissive marks representative of a function of a plurality of variables, means for forming a cathode ray, means for biasing said ray to a reference point near said target, means responsive to a voltage having an amplitude proportional to a selected value of one of said variables for moving said ray along one edge of said target, means responsive to a voltage of an amplitude proportional to a selected value of another of said variables for moving said ray across said secondary electron emissive marks, and means responsive to said movement of said ray across said marks for establishing a representation of a value of said function predetermined by the selected values of said variables.

2. The combination of a target having secondary electron emissive marks representative of a function of a plurality of variables, means for forming a cathode ray, means for biasing said ray to a reference point near said target, means responsive to a voltage having an amplitude proportional to a selected value of one of said variables for moving said ray along one edge of said target, means responsive to a voltage of an amplitude proportional to a selected value of another of said variables for moving said ray across said secondary electron emissive marks, means responsive to said movement of said ray across said marks for establishing a representation of a value of said function predetermined by the selected values of said variables, and means for interrupting said ray during its return to said reference point.

3. The combination of a target having secondary electron emissive marks representative of a function of a plurality of variables, means for forming a cathode ray, means for biasing said ray to a reference point near said target, means responsive to a voltage having an amplitude proportional to a selected value of one of said variables for moving said ray along one edge of said target, means responsive to a voltage of an amplitude proportional to a selected value of another of said variables for moving said ray across said secondary electron emissive marks, means responsive to said movement of said ray across said marks for establishing a representation of a value of said function predetermined by the selected values of said variables, means for interrupting said ray during its return to said reference point, and means responsive to said ray at said reference point for erasing said representation.

4. The combination of a target having secondary electron emissive marks representative of a function of a plurality of variables, means for forming a cathode ray, means for biasing said ray to a reference point near said target, means responsive to a voltage having an amplitude proportional to a selected value of one of said variables for moving said ray along one edge of said target, means responsive to a voltage of an amplitude proportional to a selected value of another of said variables for moving said ray across said secondary electron emissive marks, and means for delaying the movement of said ray across said marks until its movement along the edge of said target has been completed.

5. The combination of a target having secondary electron emissive marks representative of a function of a plurality of variables, means for forming a cathode ray, means for biasing said ray to a reference point near said target, means responsive to a voltage having an amplitude proportional to a selected value of one of said variables for moving said ray along one edge of said target, means responsive to a voltage of an amplitude proportional to a selected value of another of said variables for moving said ray across said secondary electron emissive marks, and means including a slideback trigger circuit unit for delaying the movement of said ray across said marks.

GEORGE A. MORTON.